(12) United States Patent
Rabolt et al.

(10) Patent No.: US 9,378,267 B2
(45) Date of Patent: Jun. 28, 2016

(54) METHODS AND APPARATUS TO SEARCH DATASETS

(71) Applicant: The Nielsen Company (US), LLC, Schaumburg, IL (US)

(72) Inventors: Kenneth Rabolt, Cary, IL (US); Nagarajan Karuppiah, Chennai (IN)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 14/631,298

(22) Filed: Feb. 25, 2015

(65) Prior Publication Data

US 2015/0169731 A1    Jun. 18, 2015

Related U.S. Application Data

(63) Continuation of application No. 13/828,780, filed on Mar. 14, 2013, now Pat. No. 9,002,886.

(51) Int. Cl.
G06F 17/30    (2006.01)

(52) U.S. Cl.
CPC .... *G06F 17/30598* (2013.01); *G06F 17/30404* (2013.01); *G06F 17/30424* (2013.01); *G06F 17/30477* (2013.01)

(58) Field of Classification Search
USPC .......... 707/705, 736, 737, 738, 771, 775
See application file for complete search history.

(56) References Cited

U.S. PATENT DOCUMENTS

| | | | |
|---|---|---|---|
| 4,905,162 A | 2/1990 | Hartzband et al. | |
| 5,546,575 A | 8/1996 | Potter et al. | |
| 5,799,184 A * | 8/1998 | Fulton | G06F 17/30327 |
| 6,061,677 A | 5/2000 | Blinn et al. | |
| 6,289,338 B1 | 9/2001 | Stoffel et al. | |
| 6,463,431 B1 | 10/2002 | Schmitt | |
| 6,513,032 B1 | 1/2003 | Sutter | |
| 7,266,545 B2 | 9/2007 | Bergman et al. | |
| 7,293,014 B2 | 11/2007 | Subramaniam et al. | |
| 7,346,608 B2 | 3/2008 | Annau et al. | |
| 7,373,318 B2 | 5/2008 | Kutsumi et al. | |
| 7,546,287 B2 | 6/2009 | Subramaniam et al. | |
| 8,738,610 B2 | 5/2014 | Anderson | |
| 9,002,886 B2 | 4/2015 | Rabolt et al. | |

(Continued)

OTHER PUBLICATIONS

United States Patent and Trademark Office, "Restriction and/or Election Requirement," issued in connection with U.S. Appl. No. 13/828,780, Nov. 7, 2014, 9 pages.

(Continued)

*Primary Examiner* — Hung T Vy
(74) *Attorney, Agent, or Firm* — Hanley, Flight & Zimmerman, LLC

(57) ABSTRACT

Methods and apparatus to search datasets are disclosed. An example disclosed apparatus includes a count generator to generate a plurality of counts, the counts respectively indicative of a number of corresponding records in a database satisfying a respective one of a plurality of criteria present in the database; a grouper to assign first and second criteria of a search request to a first group according to a logical relationship between the first and second criteria; an identifier to determine, via the plurality of counts, which of the first and second criteria in the first group is satisfied by a least amount of records in the database; and a reduced set generator to form a reduced set of records to be searched based on the determined one of the first and second criteria satisfying the least amount of records in the database.

15 Claims, 7 Drawing Sheets

(56) References Cited

U.S. PATENT DOCUMENTS

| | | |
|---|---|---|
| 2004/0098412 A1 | 5/2004 | Raspl |
| 2009/0234826 A1 | 9/2009 | Bidlack |
| 2010/0114900 A1 | 5/2010 | Anderson |
| 2014/0019447 A1* | 1/2014 | Goryavskiy ...... G06F 17/30867 707/732 |
| 2014/0280340 A1 | 9/2014 | Rabolt et al. |

OTHER PUBLICATIONS

United States Patent and Trademark Office, "Notice of Allowance and Fee(s) Due," issued in connection with U.S. Appl. No. 13/828,780, Jan. 30, 2015, 33 pages.

* cited by examiner

METHODS AND APPARATUS TO SEARCH DATASETS

RELATED APPLICATION

This patent arises from a continuation of U.S. patent application Ser. No. 13/828,780, filed Mar. 14, 2013, now U.S. Pat. No. 9,002,886, which is hereby incorporated herein by reference in its entirety.

FIELD OF THE DISCLOSURE

This patent relates generally to data management and, more particularly, to methods and apparatus to search datasets.

BACKGROUND

Many entities such as retail establishments and product manufacturers are interested in the shopping activities, behaviors, and/or habits of consumers. Consumer activity related to shopping can be used to correlate product sales with particular shopping behaviors and/or to improve timing or placement of product offerings, product promotions, and/or advertisements. To make use of such information, market analysis entities typically utilize a plurality of statistical tools to study, evaluate, and/or predict market conditions and/or consumer behavior. To implement some such statistical tools, data related to products on the market is stored in searchable databases and/or data structures.

DETAILED DESCRIPTION

Figure 1:
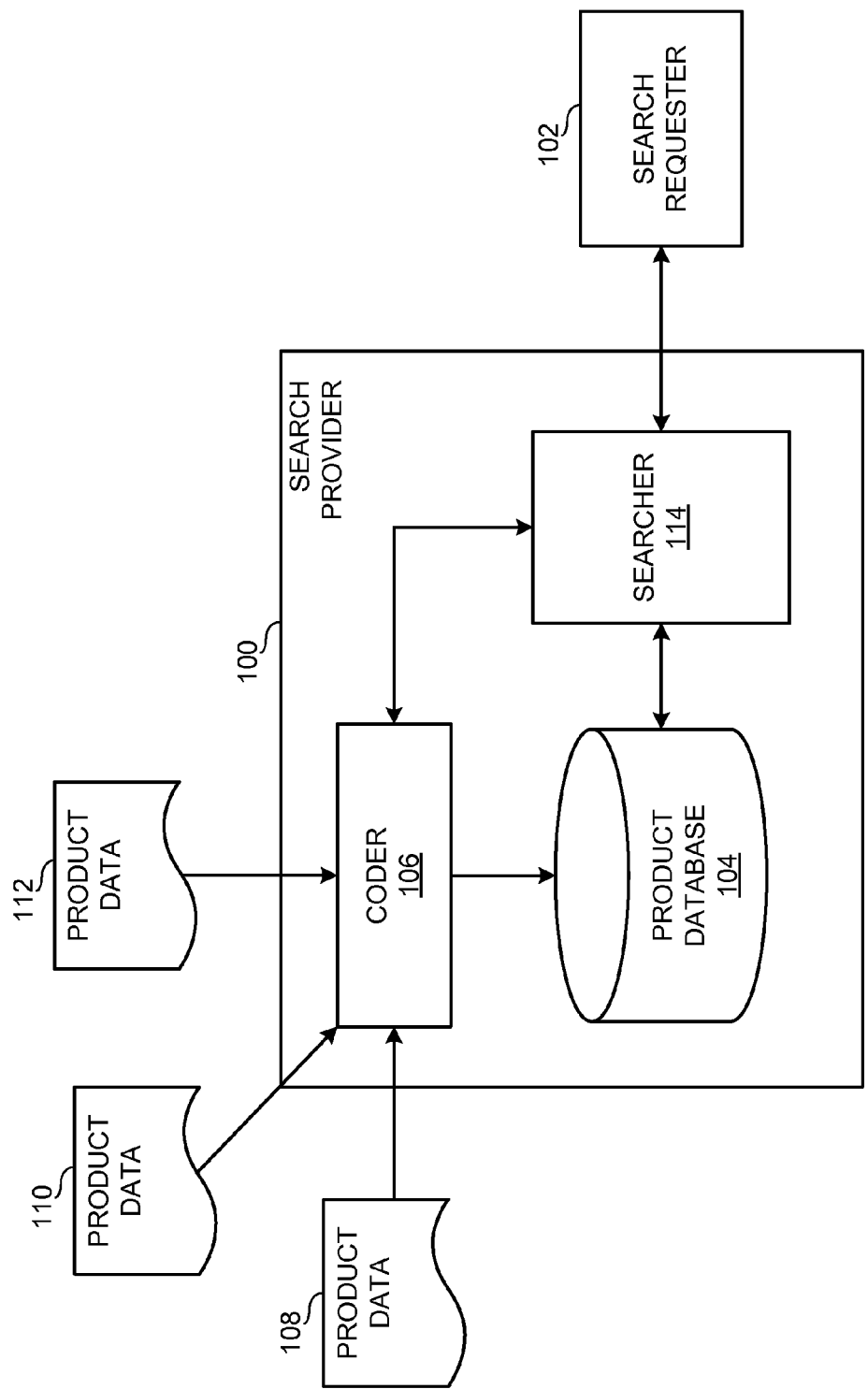
FIG. 1 is a block diagram of an example search provider.

Search providers typically manage large datasets including records related to one or more types of information. Some datasets related to product information include records having one more characteristics and/or one or more potential values for the characteristics. For example, a product database may include a first record corresponding to a first product (e.g., a jacket) having characteristics of color, size, style, and brand. The product database may also include a second record corresponding to a second product (e.g., a soft drink) having characteristics of volume, flavor, and brand. Further, each of the characteristics has a plurality of potential values. For example, the color characteristic of the first record has a certain number of potential values, such as red, blue, yellow, etc. Further, brand characteristic of the second record has a certain number of potential values, such as cherry, orange, lemon lime, etc. Each characteristic of a record and the corresponding value is referred to herein as a characteristic-value pair. For example, a first characteristic-value pair of a record corresponding to a soft drink is 'Volume=100 mL.' A second characteristic-value pair for the soft drink may be 'Brand=Pepsi®.' While the characteristic-value pairs described herein are related to consumer goods, example methods, apparatus, and/or articles of manufacture disclosed herein can be implemented in connection with additional or alternative types of records of additional or alternative types of datasets.

The size of datasets including the characteristic-value pairs can increase quickly (e.g., exponentially) when products are added to (e.g., released into) the marketplace and, therefore, added to the product database. The increase in size and complexity of the datasets presents challenges to the corresponding search providers. For example, search providers associated with burdensome (e.g., large and complex) datasets are challenged to deliver search results in a timely manner. Given the size and complexity of the datasets, processing of search results is computationally expensive and often takes a significant amount of time. However, any increase in the time taken to deliver search results may be detrimental to the search providers, as search requesters typically place a high importance on speed of delivery for search results. That is, given a choice among multiple search providers, search requesters are more likely to choose a search provider that delivers results quickly than one that delivers results slowly. Therefore, search providers benefit from an ability to search and convey search results at higher speeds.

Example methods, apparatus, systems, and/or articles of manufacture disclosed herein improve search speeds and, thus, enable search providers to deliver search results faster than previous systems. As described in greater detail below, examples disclosed herein generate one or more count statistics regarding one or more aspects of the records of a dataset to facilitate a reduction in an amount of records to be searched in response to a search request. In particular, examples disclosed herein calculate a count of records or entries in the dataset for some or all of the individual characteristic-value pairs present in the dataset. In other words, examples disclosed herein calculate a first count equal to an amount of records currently present in the dataset that include a first particular characteristic-value pair (e.g., Brand=Pepsi®), a second count equal to an amount of records currently present in the dataset that include a second particular characteristic-value pair (e.g., Flavor=Cherry), and so on for some or all of the characteristic-value pairs occurring in the dataset. Examples disclosed herein store the calculated counts for the records of the dataset to form a collection of count statistics. While the example counts disclosed herein are described in connection with characteristic-value pairs, examples disclosed herein can be implemented in connection with additional or alternative types of search criteria. For example, the count statistics generated by examples disclosed herein may be indicative of numbers of records including respective keywords.

Example methods, apparatus, and/or articles of manufacture disclosed herein utilize the count statistics to service search requests faster than previous systems. As described in greater detail below, in response to a search request including a plurality of search criteria (e.g., characteristic-value pairs), examples disclosed herein reference the previously generated count statistics to develop a reduced set (e.g., subset) of records on which at least one component of the requested search is performed. That is, rather than searching the entire database of product records for each of the search criteria of a search request, examples disclosed herein utilize the previously generated count statistics to lessen the number of records that need to be searched in connection with one or more of the search criteria of the requested search.

To generate the reduced set of records, examples disclosed herein identify a driving search criterion (e.g., characteristic-value pair) for logically related groups of search criteria present in the requested search. When a search request includes a group of criteria related to each other via one or more logical operators (e.g., AND, OR, etc.) in the search request definition, the group of terms is referred to herein as a logically related group of search criteria. Search providers typically enable requesters to include logical operators (e.g., AND, OR, etc.) in search requests to define searches beyond the individual criteria (e.g., characteristic-value pairs, keywords, etc.) of the search request such that more relevant search results are delivered to the requester.

Examples disclosed herein recognize that a driving search criterion can be identified for such groups of search criteria by generating and analyzing the count statistics disclosed herein. For example, for a search request including first and second search criteria logically related via an AND operator, examples disclosed herein reference the count statistics to determine which one of the first and second search criteria is associated with the least amount of records in the database. In other words, examples disclosed herein utilize the previously generated count statistics to determine a first amount of records meeting the first search criteria and a second amount of records meeting the second search criteria. Examples disclosed herein select the lesser of the first and second amounts as the driving search criterion for the logically related group of search criteria. Examples disclosed herein identify the search criterion met in the lesser amount of records as the driving search criterion because any records deemed to have met the search request as a whole (e.g., the logical definition of the search request, including the AND operator) must at least meet the driving search criterion. Put another way, the driving search criterion identified by examples disclosed herein represents the criterion of the corresponding search that is met by the least number of records in the database and, thus, defines the maximum number of records of the database that can meet the entire search definition.

Accordingly, examples disclosed herein develop a reduced set of records (e.g., a subset) that includes records of the database meeting the selected driving search criterion. In other words, example disclosed herein use the selected driving search criterion as a basis to develop a subset of the records of a database for searching with the non-driving criteria. To continue the above example, assume that the first search criterion is selected as the driving search criterion for the logically related (e.g., via an AND operator) first and second search criteria. In such instances, examples disclosed herein define (e.g., by setting a flag or indicator in association with individual ones of the records) the reduced set of records to include records meeting the first search criterion. Examples disclosed herein then perform a search on the reduced set of records using one or more second search criterion. That is, examples disclosed herein determine which one(s) of the reduced set of records satisfies the one or more second search criterion. Thus, rather than having to determine which records of the entire database meet the one or more second search criterion, examples disclosed herein search for the second criterion on only a subset of the database records. Some databases (e.g., product tracking databases for consumer goods) include large amounts (e.g., billions, trillions, etc.) of records and/or characteristic-value pair possibilities. Thus, as further demonstrated below, the reduction in the amount of records to search provided by examples disclosed herein dramatically reduces search times.

FIG. 1 is a block diagram of an example system in which example methods, apparatus, and/or articles of manufacture disclosed herein may be implemented. The example of FIG. 1 includes a search provider 100 that receives search requests from search requesters, one of which is shown in FIG. 1 with reference numeral 102. In some examples, the search provider 100 is a proprietor of a search engine (e.g., Nielsen®, Google®) and the search requester 102 communicates with the search provider 100 via publically available communication systems (e.g., the Internet). Additionally or alternatively, the example search requester 102 communicates with the search provider 100 according to an agreement (e.g., contract) such that the search provider 100 provides one or more search services to the search requester 102 (e.g., via publically available and/or private communication systems).

In the illustrated example of FIG. 1, the search provider 100 provides market research services to the search requester 102 including access to a product database 104 managed by the search provider 100. The example product database 104 is a collection of records related to products (e.g., consumer goods) available in one or more marketplaces (e.g., geographic areas, industries, virtual marketplaces, markets, etc.). In the example of FIG. 1, the search provider 100 strives to store a record in the product database 104 for each product available in the one or more marketplaces tracked by the search provider 100. The individual records of the example product database 104 of FIG. 1 have one or more characteristics and corresponding values for the characteristics, thereby forming a plurality of characteristic-value pairs. As described above, each characteristic of a particular record has one or more potential values. That is, different versions of a product have a corresponding record in the product database 104 depending on, for example, variation(s) in the different values for the characteristic(s) of the products. Thus, the example product database 104 of FIG. 1 reflects the available products in different marketplaces and the different aspects associated with the available products. In such instances, the search requester 102 is, for example, a person or entity interested in product(s) of marketplace(s), such as a media planner, an advertiser, a marketing entity, a product developer, a manufacturer of consumer goods, a retailer, etc.

The example product database 104 of FIG. 1 is maintained by coders (e.g., programmers, administrators, data entry professionals, etc.) associated with the search provider 100, one of which is shown in FIG. 1 with reference numeral 106. When the search provider 100 becomes aware of an available product not having a corresponding record in the product database 104, the example coder 106 of FIG. 1 is tasked with creating a new record for the product and integrating the new record into the example product database 104. In some examples, the coder 106 is also tasked with determining whether a particular product is actually new with respect to the product database 104. In other words, a person or device associated with the search provider 100 may have reason to believe that a particular product may not have a corresponding record in the product database 104 (e.g., the person or device is not familiar with a product and wants to ensure that the product database 104 includes a corresponding record). Additionally or alternatively, a person or device associated with the search provider 100 may provide information regarding particular product(s) to the example search provider 100 according to a schedule (e.g., in a weekly batch) and the search provider 100 may process the received information to determine whether the product database 104 includes record(s) corresponding to the product(s).

In the example of FIG. 1, instances of product data 108, 110, 112 associated with products of interest (e.g., products potentially not recorded in the product database 104) are received by the coder 106 in connection with, for example, a request to create a new record for the corresponding product in the product database 104 and/or a request to determine whether the product database 104 already includes a record for the corresponding product. In such instances, the coder 106 determines whether the example product database 104 includes a record corresponding to the product data 108-112. If the example product database 104 does not include a record for any of the product data 108-112, the example coder 106 of FIG. 1 creates a record for the new product(s).

Each of the example instances of product data 108-112 of FIG. 1 includes a description of the corresponding product such as, for example, a specification and/or lists of features. To determine whether the example product database 104 of FIG. 1 includes a record associated with, for example, the first instance of product data 108 and/or to lookup a particular product in the product database 104, the example coder 106 submits a search request to an example searcher 114 constructed in accordance with example methods, apparatus, and/or articles of manufacture disclosed herein. The search request submitted by the example coder 106 is developed or written by the coder 106 based on descriptive information of the first instance of product data 108 and includes, for example, one or more characteristic-value pairs. For example, when the first instance of product data 108 corresponds to a soft drink and the corresponding descriptive information indicates that the soft drink is a Pepsi® product and has a volume of 100 mL, the coder 106 generates a search request including a first characteristic-value pair of 'Brand=Pepsi®' and a second characteristic-value pair of 'Volume=100 mL.' In some instances, the characteristic-value pair(s) of the search request are logically related via, for example, a logical operator used by the example coder 106 to further define the search request. The example coder 106 expects search results indicative of whether the example product database 104 includes a record corresponding to such a soft drink.

In the illustrated example of FIG. 1, the example search provider 100 receives similar search requests from, for example, the search requester 102 of FIG. 1. That is, the example search requester 102 submits search request(s) including one or more characteristic-value pairs, which may or may not be logically related by a logical operator, to the example searcher 114 of FIG. 1. For example, when the search requester 102 is a media planner and/or advertiser interested in products of a particular brand, the example search requester 102 submits a search request to the example searcher 114 that includes a characteristic-value pair identifying the brand of interest. Additional or alternative types of search requests, requesters, types of search criteria, etc. are possible.

As described in detail below in connection with FIGS. 2-5, the example searcher 114 of FIG. 1 generates count statistics for the example product database 104, uses the count statistics to develop a reduced set of records to search in response to a search request, and searches the reduced set of records to deliver search results to a device associated with the search request (e.g., a computing device associated with the coder 106 and/or a computing device associated with the search requester 102) in a timely manner. In some instances, the example coder 106 of FIG. 1 utilizes the search results provided by the example searcher 114 to maintain the product database 104. To continue the above example, if the searcher 114 indicates that the product database 104 does not currently include a record associated with the first instance of product data 108, the example coder 106 generates a new record for the corresponding product and stores the new record in the example product database 104. Alternatively, if the product database 104 already includes a record associated with the first instance of product data 108, the example searcher 114 informs the coder 106 that the product database 104 includes a corresponding product record and that adding a new record for the product data 108 is not necessary.

As the example product database 104 of FIG. 1 includes a large number of records, most of which include a plurality of aspects or characteristics, delivering search results in a timely manner is a challenge. In this context, the benefits provided by the example searcher 114 are significant. In particular, the example searcher 114 of FIG. 1 reduces search delivery time and conserves computational resources by reducing the number of records accessed during searches. Further, users (e.g., the example coder 106 and/or the search requester 102) may utilize the example searcher 114 of FIG. 1 frequently and, thus, repeatedly receive the benefit of faster delivery of search results provided by the example searcher 114.

Figure 2:
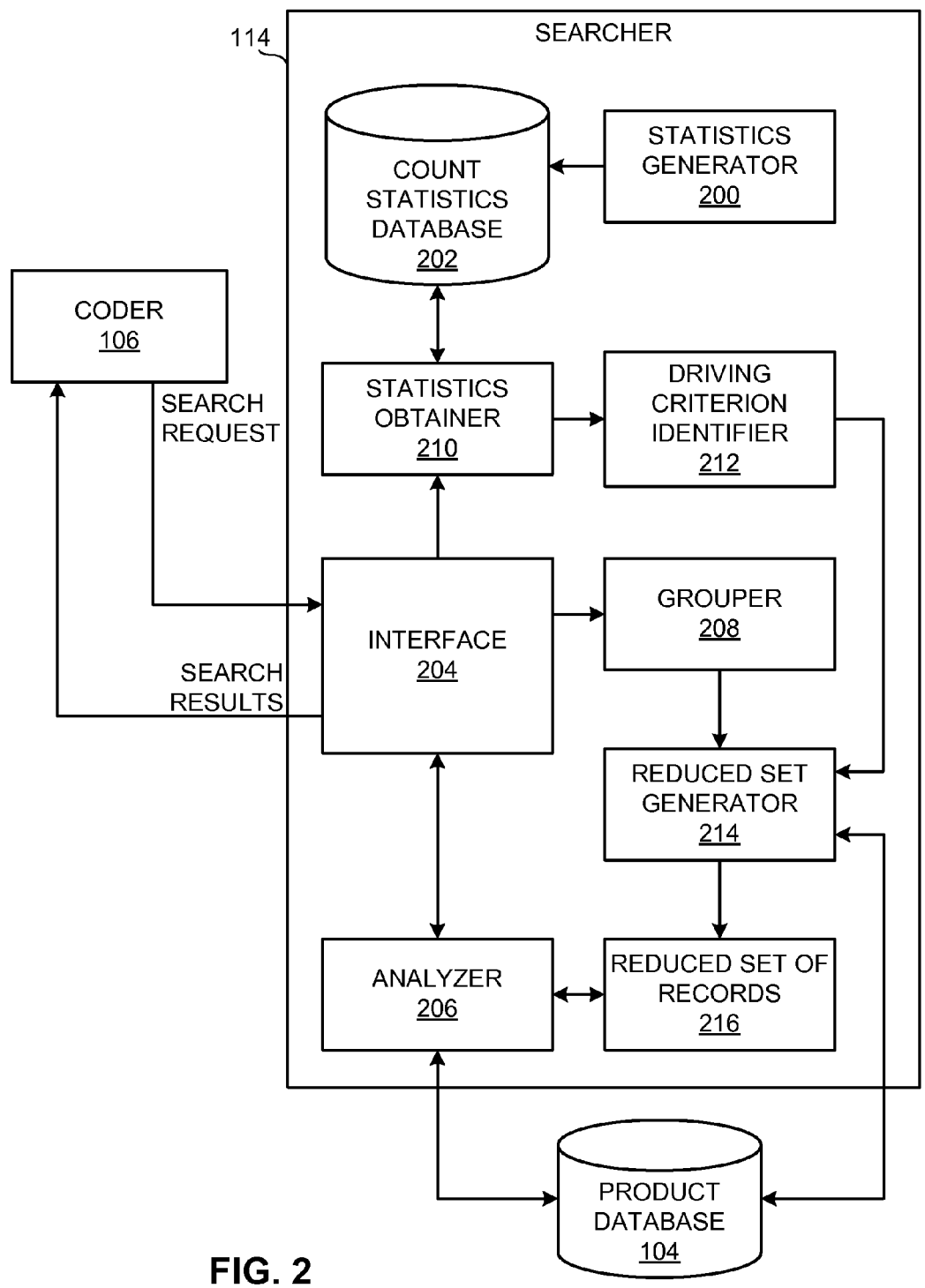
FIG. 2 is a block diagram of an example implementation of the example searcher of FIG. 1.
Figure 3:
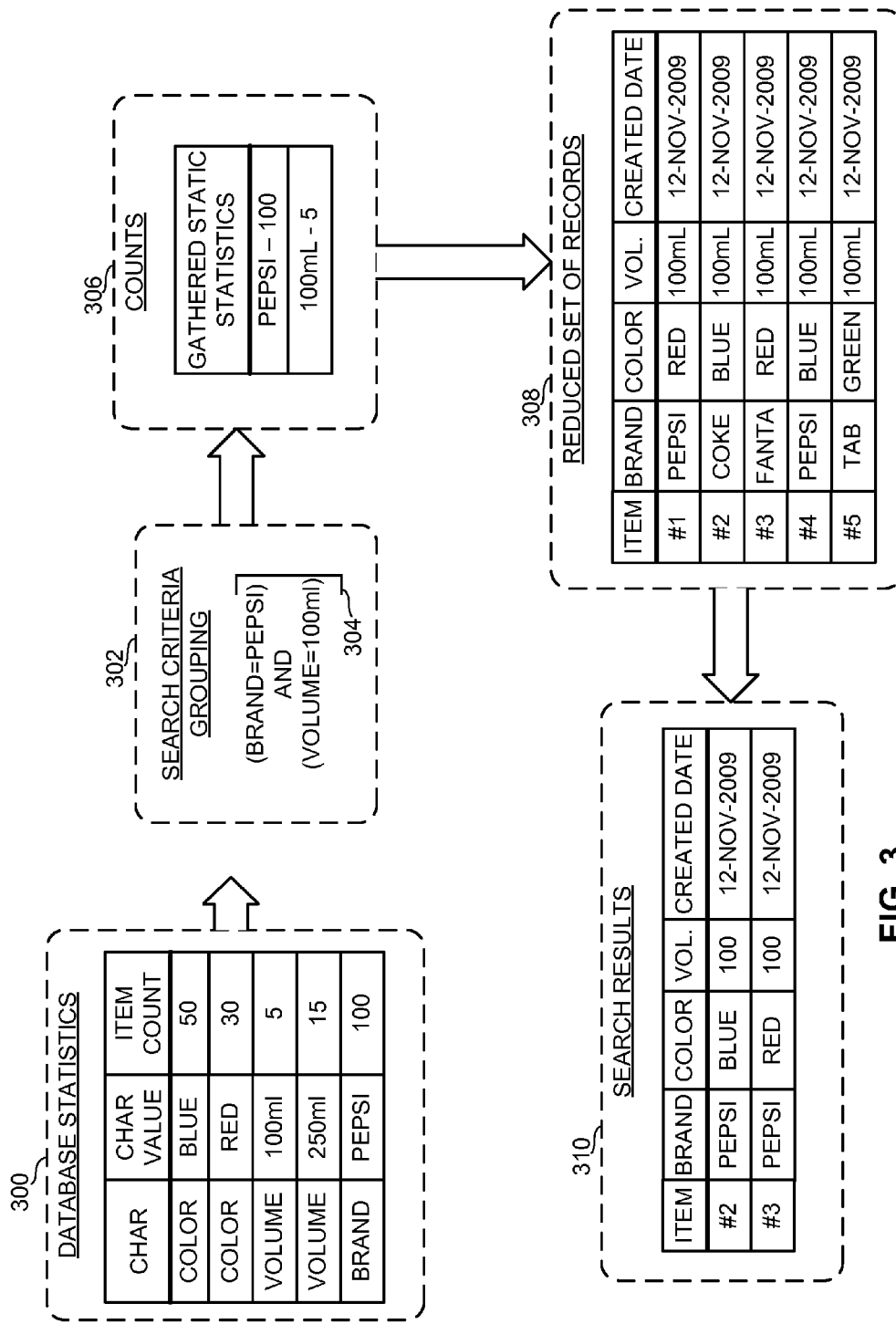
FIG. 3 is an illustration of first example information generated by the example searcher of FIGS. 1 and/or 2.
Figure 4:
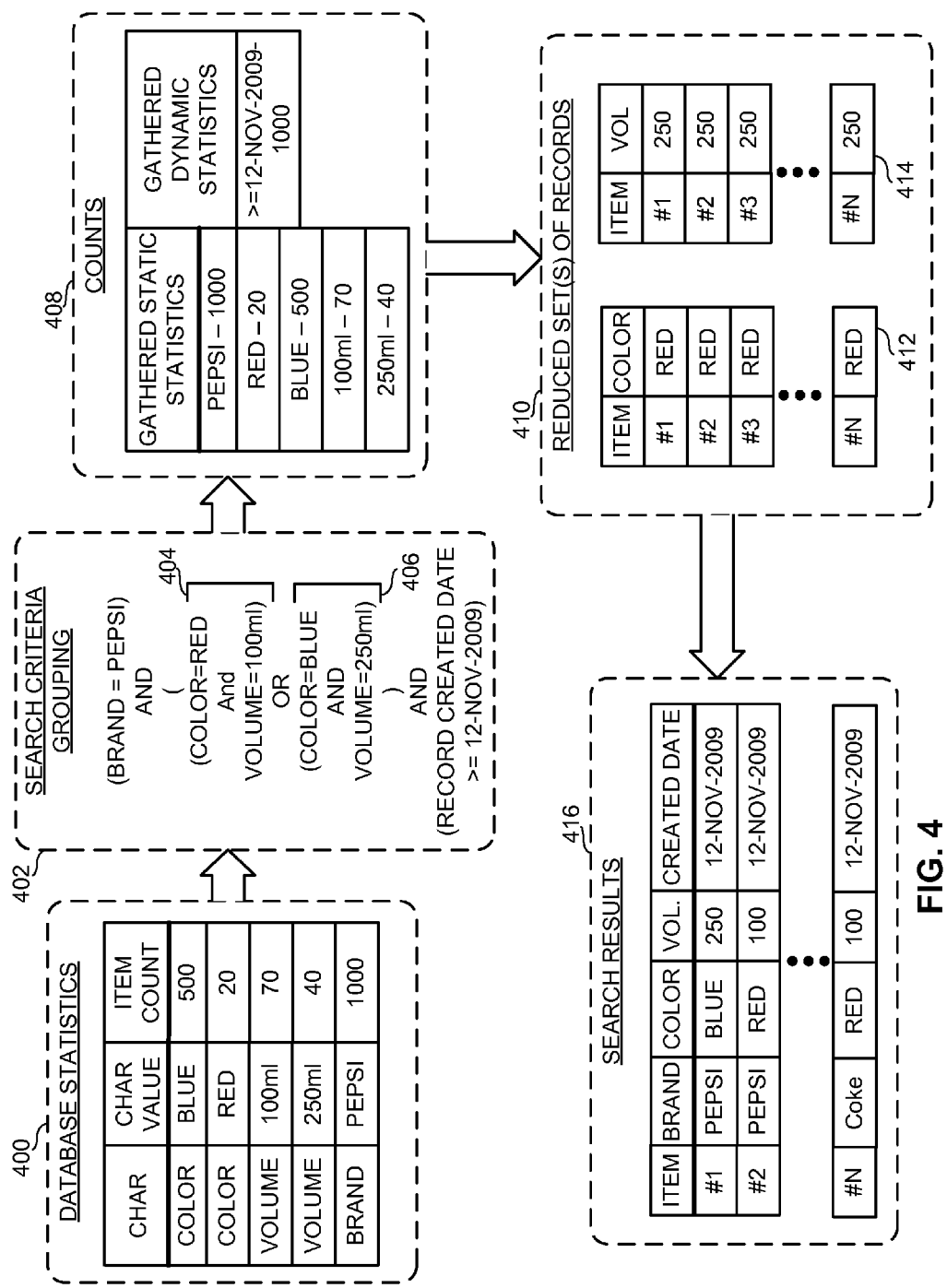
FIG. 4 is an illustration of second example information generated by the example searcher of FIGS. 1 and/or 2.

FIG. 2 is a block diagram of an example implementation of the example searcher 114 of FIG. 1. FIG. 2 is described herein in conjunction with FIGS. 3 and 4, which are illustrations of example information utilized by the example searcher 114 of FIGS. 1 and/or 2 and information generated by the example searcher 114 of FIGS. 1 and/or 2. The information presented in FIGS. 3 and 4 is for purposes of illustration and has been scaled down to amounts of data smaller than a typical instance of the product database 104 of FIG. 1 for purposes of brevity and enhanced clarity. While example information from FIGS. 3 and 4 is referred to herein in connection with FIG. 2, the example searcher 114 of FIG. 2 can interact with and generate additional type(s) and/or amount(s) of information.

The example searcher 114 of FIG. 2 includes a statistics generator 200 to generate count statistics based on the information in the example product database 104 of FIG. 1. To begin generation of the count statistics, the example statistics generator 200 of FIG. 2 identifies the different characteristic-value pairs present in the product database 104. In some examples, the statistics generator 200 identifies characteristic-value pairs associated with active products (e.g., currently being made for sale and/or marketing, as indicated by a corresponding active universal product code (UPC)) in the example product database 104. In some examples, the product database 104 and/or the statistics generator 200 maintains a list of characteristic-value pairs currently stored in the product database 104. In such instances, the example statistics generator 200 references the list to identify the current characteristic-value pairs of the product database 104.

For each of the identified characteristic-value pairs of the product database 104, the example statistics generator 200 of FIG. 2 maintains a count in a count statistics database 202. The example statistics generator 200 of FIG. 2 generates and/or updates the count statistics database 202 according to a schedule (e.g., nightly, weekly, etc.) and/or in response to addition(s) to the example product database 104 of FIG. 1. In some examples, the statistics generator 200 determines that one or more new products have been entered into the product database 104 since the previous update of the count statistics database 202. In such instances, the example statistics generator 200 analyzes data associated with the new product(s) and updates (e.g., increments, decrements, and/or otherwise increases or decreases) the corresponding counts in the example count statistics database 202 accordingly. In some examples, the statistics generator 200 of FIG. 2 generates and/or updates the statistics during a period of expected low activity (e.g., inactivity, such as at night and/or a weekend day). Additional or alternative update scheme(s), timing, and/or technique(s) are possible.

FIG. 3 includes example counts 300 of the example count statistics database 202 of FIG. 2 after a generation and/or update of the count statistics performed by the example statistic generator 200 of FIG. 2. In the illustrated example of FIG. 3, the product database 104 includes five (5) characteristic-value pairs for which counts are to be generated. As mentioned above, the example data of FIG. 3 is scaled down from the typical volume of a product database for purposes of illustration and enhanced clarity. A typical instance of the example product database 104 of FIGS. 1 and/or 2 is likely to include significantly more than five (5) characteristic-value pairs. In the example of FIG. 3, the example statistics generator 200 has determined that the product database 104 includes fifty (50) records having the characteristic-value pair 'Color=Blue,' thirty (30) records having the characteristic-value pair 'Color=Red,' five (5) records having the characteristic-value pair 'Volume=100 mL,' fifteen (15) records having the characteristic-value pair 'Volume=250 mL,' and one hundred (100) records having the characteristic-value pair 'Brand=Pepsi®.' The characteristic-value pairs shown in the example counts 300 of FIG. 3 are referred to herein as static characteristic-value pairs in that the respective static characteristic-value pairs satisfy a single, fixed search criterion. That is, the static characteristic-value pair 'Color=Blue' satisfies only one corresponding search criterion (e.g., Color/Blue). However, other characteristic-value pairs satisfy more than one search criterion when the corresponding search criterion to be submitted by a search requester can include, for example, a range. Characteristic-value pairs that satisfy more than one search criterion and that can be searched using a range are referred to herein as dynamic characteristic-value pairs. An example dynamic characteristic-value pair is a date of creation for a product record. The date of creation for a record is dynamic in the sense that the date of creation may be equal to, greater than, or less than a particular search criterion. That is, a search request can include a search criterion of, for example, 'CreationDate/>=12 Nov. 2009,' which corresponds to a request to retrieve product records having a date of creation greater than or equal to Nov. 12, 2009. Thus, dynamic characteristic-value pairs correspond to aspects of the product records that are searchable using a range of values.

In the illustrated example of FIG. 2, the example statistics generator 200 of FIG. 2 generates counts for static characteristic-value pairs according to, for example, a schedule and/or in response to new product records being added to the product database 104. Thus, in the illustrated example, the statistics generator 200 regularly maintains a count for each static characteristic-value pair of the product database 104. For example, the example statistics generator 200 of FIG. 2 calculates how many records of the product database satisfy the characteristic-value pair 'Color=Blue' each time an update of the statistics generator 200 is triggered (e.g., according to a schedule or in response to an addition of record(s) to the product database 104). In contrast, for a dynamic characteristic-value pair of the product database 104, the example statistics generator 200 of FIG. 2 generates a count in response to receiving a corresponding search criterion in connection with a received search request. That is, the example statistics generator 200 of FIG. 2 waits to receive a search criterion associated with the respective dynamic characteristic-value pairs of the product database 104 before generating a corresponding count. The utilization of the count statistics generated by the example statistics generator 200 and stored in the example count statistics database 202 are described in greater detail below.

As described above in connection with FIG. 1, the example searcher 114 receives a search request (e.g., from the coder 106, the search requester 102, or other user(s)) that includes one or more search criteria. The search criteria received by the example searcher 114 of FIG. 2 includes, for example, one or more characteristic-value pairs (e.g., static characteristic-value pair(s) and/or dynamic characteristic-value pair(s)) indicative of one or more product characteristics (e.g., brand, color, volume, etc.) and/or aspects of the corresponding product records. For example, in response to a task assigned to the coder 106 of FIG. 1 related to the first product data 108 (FIG. 1), the example coder 106 generates a search request including one or more characteristic-value pairs indicative of one or more aspects of the first product data 108 for submission to the searcher 114. In such instances, the example coder 106 submits the generated search request to the example searcher 114 to determine whether the product database 104 (FIG. 1) already includes a product corresponding to the first product data 108 and/or to identify similar products having records in the product database 104. Additionally or alternatively, the example search requester 102 may want to identify products available in a marketplace having one or more particular aspects, such as a particular brand, a particular color, a particular quantity, and/or any other suitable aspect(s). In such instances, the search requester 102 generates a search request including one or more characteristic-value pairs corresponding to the aspects of interest and submits the generated search request to the example search request to the example searcher 114 of FIG. 2. For purposes of illustration and brevity, the example of FIG. 2 shows the searcher 114 receiving a search request from the example coder 106 of FIG. 1.

In response to receiving the search request from the coder 106, an interface 204 of the example searcher 114 of FIG. 2 determines whether the search request includes a single search criterion or multiple search criteria. When the example interface 204 of FIG. 2 determines that the searcher 114 of FIG. 2 has received a search request including a single search criterion (e.g., a single characteristic-value pair), the example interface 204 provides the single search criterion to an analyzer 206 of the example searcher 114. In the illustrated example of FIG. 2, the analyzer 206 searches the product database 104 to identify record(s) of the product database 104 meeting the single search criterion. The example analyzer 206 of FIG. 2 implements any suitable search mechanism and/or technique to parse through the records of the product database 104 using the search criterion. For example, when the single search criterion of the search request is a characteristic-value pair, the example analyzer 206 of FIG. 2 compares the characteristic-value pairs of the product database 104 with the characteristic-value pair of the single-criterion search request.

If the example record 206 of FIG. 2 determines that the product database 104 includes product record(s) that match the product data of the search request, the example analyzer 206 provides the matching record(s) and/or identifier(s) associated with the matching record(s) to the interface 204. The example interface 204 of FIG. 2 communicates the matching record(s) and/or the corresponding identifier(s) to one or more devices associated with the search request. In the illustrated example of FIG. 2, the interface 204 provides the matching record(s) and/or the corresponding identifier(s) to a network address associated with the received search request, which corresponds to a computing device of the coder 106. Additionally or alternatively, the example interface 204 of FIG. 2 can provide access to the matching record(s) by, for example, communicating a link (e.g., hyperlink, path name, etc.) and/or instructions on how to access the matching record(s) to the coder 106.

While some search requests include a single search criterion, such searches are likely to generate a large number of search results. To obtain more focused search results, search requesters often submit search requests that include multiple search criteria. For example, a search request submitted by the coder 106 of FIG. 1 may include a first characteristic-value pair (e.g., Brand=Pepsi®), a second characteristic-value pair (e.g., Color=Red), a third characteristic-value pair (e.g., Volume=100 mL), and so on. In such instances, the multiple search criteria are logically related via one or more logical operators, such as an OR operator or an AND operator. The example searcher 114 of FIG. 2 includes a grouper 208 to identify logical relationship(s) between search criteria and to form group(s) of search criteria according to the logical relationship(s). In some examples, the search requester provides the logical operators as part of the search request. In such instances, the example grouper 208 uses the logical operators provided by the search requester to form one or more groups of search criteria reflecting the logical relationship(s) established by the search requester. In some examples, the search requester does not provide an explicit logical operator between some or any of the search criteria. In such instances, the example grouper 208 of FIG. 2 treats the individual search criteria as related via an OR operator. Alternatively, when the search requester does not include an explicit logical operator between search criteria, the example grouper 208 of some examples treats individual search criteria as related via an AND operator. The example grouper 208 of FIG. 2 is configurable to alter one or more setting related to the treatment of search criteria not explicitly tied together via a logical operator.

When the example grouper 208 of FIG. 2 identifies search criteria related via an AND operator, the example grouper 208 groups the AND-related search criteria by, for example, assigning a shared group identifier to the search criteria and/or placing the AND-related search criteria in a shared portion of a data structure. The example of FIG. 3 includes an example grouping definition 302 corresponding to a search criteria group 304 generated by the example grouper 208 of FIG. 2. The example grouping definition 302 corresponds to a search request submitted to the searcher 114 of FIG. 2 by the coder 106 including a first search criterion 'Brand=Pepsi®' and a second search criterion 'Volume=100 mL' logically related via an AND operator. The coder 106 submits such a search request in response to, for example, determining that the first product data 108 of FIG. 1 corresponds to a Pepsi® soft drink made available in a 100 mL container. In response to receiving such a search request, the example grouper 208 generates the grouping definition 302 of FIG. 3 indicative of the desire of the coder 106 to retrieve records having the characteristic-value pair 'Brand=Pepsi®' and the characteristic-value pair 'Volume=100 mL.' Because the first and second search criteria are logically related by an AND operator, the grouping definition 302 includes the search criteria group 304 including both the first and second search criteria.

In addition to providing search requests having multiple search criteria to the example grouper 208, the example interface 204 of FIG. 2 provides the search criteria of multiple-criteria search requests to a statistics obtainer 210. The example statistics obtainer 210 of FIG. 2 uses the received search criteria to reference the example count statistics database 202 of FIG. 2. In particular, the example statistics obtainer 210 of FIG. 2 retrieves the individual counts associated with each of the received search criteria. That is, the example statistics obtainer 210 of FIG. 2 determines, via the count statistics database 202, how many records of the product database 104 satisfy a first search criterion of a multiple-criteria search request, how many records of the product database 104 satisfy a second search criterion of the multiple-criteria search request, how many records of the product database 104 satisfy a third search criterion of the multiple-criteria search request, etc. FIG. 3 includes an illustration of the counts 306 retrieved by the example statistic obtainer 210 in connection with the above example search request including the first search criterion 'Brand=Pepsi®' and the second search criterion 'Volume=100 mL.' In the illustrated example of FIG. 3, the statistics obtainer 210 has determined that the product database 104 includes one hundred (100) records satisfying the first search criterion 'Brand=Pepsi®' and five (5) records satisfying the second search criterion 'Volume=100 mL.'

The example searcher 114 of FIG. 2 includes a driving criterion identifier 212 that receives the counts retrieved by the example statistics obtainer 210 of FIG. 2. The example driving criterion identifier 212 of FIG. 2 selects one of the search criteria of the multiple-search criteria group 304 as the driving search criterion for the search request. In the illustrated example, the driving criterion identifier 212 identifies the lowest of the received counts as the driving criterion. Thus, the example driving criterion identifier 212 selects the search criterion of the search request that satisfies the least number of records of the product database 104. As described above, identification of the driving criterion enables the example searcher 114 to avoid having to search the entire product database 104 for one or more search criteria of a received search request, thereby reducing the amount of records to search and increasing search speeds. That is, the selected driving search criterion is used as a basis to generate a reduced set of records to be searched rather than the entire product database 104. In the illustrated example of FIG. 3, the driving criterion identifier 212 compares the count of one-hundred (100) records associated with the first search criterion 'Brand=Pepsi®' to the count of five (5) records associated with the second search criterion 'Volume=100 mL.' As five (5) is less than one hundred (100), the example driving criterion identifiers 212 of FIG. 2 selects the second search criterion 'Volume=100 mL' as the driving criterion for the example search request of FIG. 3.

In the illustrated example of FIG. 2, the driving criterion identifier 212 provides a reduced set generator 214 with an indicator or identifier indicative of which search criterion is to be used as the driving search criterion for the corresponding group(s) of the search request. Further, the example grouper 208 provides the reduced set generator 214 with the search criteria as grouped according to the logical operators of the search request. Thus, the example reduced set generator 214 receives group(s) of search criteria from the example grouper 208 and an indication for each one of the group(s) from the driving criterion identifier 212 of which criterion has been selected as the driving criterion for the respective group. The example reduced set generator 214 of FIG. 2 uses the driving criterion as a basis for generating a reduced set of records corresponding to a subset of the records of the product database 104. In particular, for each of the received AND-related groups of search criteria (e.g., each set of terms joined by an AND logical operator) generated by the grouper 208, the example reduced set generator 214 of FIG. 2 queries the product database 104 with the corresponding driving criterion to retrieve the records of the product 104 satisfying the driving criterion.

For example, if a first driving search criterion selected for a first group of a search request corresponds to a first characteristic-value pair that is present in one thousand (1,000) records of the product database 104, the example reduced set generator 214 of FIG. 2 retrieves the one thousand (1,000) records of the product database 104 satisfying the first driving search criterion as the reduced set of records. In some examples, the search request includes a second group for which a second driving search criterion is selected. For example, the second driving search criterion may correspond to a second characteristic-value pair that is present in two thousand (2,000) records of the product database 104 satisfying the second driving search criterion. In such instances, the example reduced set generator 214 generates a first reduced set of one thousand (1,000) records for the first AND-related group of the search request and a second reduced set of two-thousand (2,000) records for the second AND-related group of the search request.

FIG. 3 includes an example reduced set of records 308 generated by the example reduced set generator 214 of FIG. 2. As described above, the example reduced set of records 308 of FIG. 3 includes the records of the product database 104 that satisfy the driving search criterion of the example group 304 formed by the example grouper 208. As the driving search criterion of the example of FIG. 3 is 'Volume=100 mL,' the records of the example reduced set of records 308 are the five (5) records of the product database 104 that include the characteristic-value pair 'Volume=100 mL.' In comparison, the product database 104 includes a total of two hundred (200) records. Thus, the example searcher 114 of FIG. 2 enables a search for 'Brand=Pepsi®' in the reduced set of records 308 that includes five (5) records, as opposed to having to search the two hundred (200) records of the product database 104 for 'Brand=Pepsi®.' As a result, the time required for the search and the burden on the processing capabilities of the system are reduced.

In the illustrated example of FIG. 2, the results of the reduced set generator 214 (e.g., the reduced set of records 308 of FIG. 3) are stored as a reduced set of records 216 accessible by the example analyzer 206 of FIG. 2. As described above, the example analyzer 206 analyzes a set of records to identify record(s) of the set that satisfy specified criteria. The analysis of the product database 104 performed by the example analyzer 206 of FIG. 2 in connection with single-criteria search requests is described above. While the example analyzer 206 of FIG. 2 searches the product database 104 for single-criteria search requests, the example analyzer 206 searches the reduced set of records 216 in connection with multiple-criteria search requests. In particular, the example analyzer 206 of FIG. 2 determines which of the reduced set of records 216 satisfies the criterion or criteria of the corresponding group (e.g., as generated by the group generator 208) other than the driving search criterion (e.g., as identified by the driving criterion identifier 212). Without the example reduced set of records 216 provided by the example searcher 114 of FIG. 2, the analyzer 206 would need to perform a search of the entire product database 104 for each one of the search criteria of the corresponding search request. In contrast, by generating the example reduced set of records 216, the example searcher 114 of FIG. 2 enables the example analyzer 206 to search a subset of the product database 104 for one or more of the search criteria. For example, when the searcher 114 is processing the example search request of FIG. 3, the analyzer 206 determines which of the reduced set of records 308 includes the non-driving search criterion "Brand=Pepsi®.' To do so, the example analyzer 206 of FIG. 2 is tasked with analyzing five (5) records instead of having to search the two hundred (200) records of the product database 104. As the illustrated examples are scaled down representations of typical product databases, which can include millions of records, the benefits in search speeds (e.g., via the reduction in the amount of records to be searched) are likely greater than the illustrated examples. In the example of FIG. 3, the analyzer 206 identifies two (2) of the records of the reduced set of records 308 as satisfying the non-driving criterion 'Brand=Pepsi®.' A collection of the two (2) records meeting the example search request of FIG. 3 is stored as search results 310 in the example of FIG. 3.

In the illustrated example of FIG. 2, the example analyzer 206 provides the search results to the example interface 204, which provides the search results and/or access to the search results to the coder 106. Thus, the example searcher 114 of FIG. 2 provides the coder 106 with search results without having to search the entire product database 104 with each of the search criteria (when the search request includes multiple search criteria). Accordingly, the example searcher 114 of FIG. 2 significantly decreases the amount of time and the amount of computer processing resources needed to generate and deliver search results.

FIG. 4 depicts another example instance of the example product database 104 and another example search request serviced by the example searcher 114 of FIG. 2. In the illustrated example of FIG. 4, the product database 104 includes a set of records having the statistics 400 generated by the example statistics generator 200 of FIG. 2. The example statistics 400 shown in FIG. 4 are stored in the count statistics database 202 of FIG. 2. The criteria of the example search request of FIG. 4 is received by the example grouper 208 of FIG. 2 (e.g., via the interface 204), which identifies a logical relationship for each of the search criteria. In the example of FIG. 4, the grouper 208 generates a criteria grouping 402 defined to include a first criteria group 404 and a second criteria group 406. The first example group 404 of FIG. 4 includes the search criteria 'Color=Red' and 'Volume=100 mL.' The second example group 406 of FIG. 4 includes the search criteria 'Color=Blue' and 'Volume=250 mL.'

The example statistics obtainer 210 of FIG. 2 obtains the count statistics 408 of FIG. 4 for each of the search criteria of the received search request. In the illustrated example, the statistics obtainer 210 obtains the statistics for the static characteristic-value pairs ('Brand=Pepsi®,' 'Color=Red,' 'Volume=100 mL,' and 'Color=Blue,' 'Volume=250 mL') from the count statistics database 202 of FIG. 2. Further, the example statistics generator 200 responds to the example search request of FIG. 4 by generating a count for the dynamic characteristic-value pair 'RecordCreatedDate>=12 Nov. 2009.'

The example driving criterion identifier 212 of FIG. 2 uses the count statistics 408 to select one of the search criteria for each group as the driving search criterion for the respective group. In the illustrated example, the driving criterion identifier 212 selects the characteristic-value pair 'Color=Red' for the first group 404 because less records of the product database 104 satisfy the characteristic-value pair 'Color=Red' than the characteristic-value pair 'Volume=100 mL.' Further, the driving criterion identifier 212 selects the characteristic-value pair 'Volume=250 mL' for the second group 406 because less records of the product database 104 satisfy the characteristic-value pair 'Color=Blue.'

Using the respective driving criteria, the example reduced set generator 214 of FIG. 2 generates reduced sets of records for each of the groups identified by the example grouper 208. The example of FIG. 4 includes a first reduced set of records 412 including records of the product database 104 that satisfy the first driving criterion 'Color=Red' and a second reduced set of records 414 including records of the product database 104 that satisfy the second driving criterion 'Volume=250 mL.' In the illustrated example of FIG. 4 the analyzer 206 searches the first reduced set of records 412 for the non-driving criterion 'Volume=100 mL' and the second reduced set of records 414 for the non-driving criterion 'Color=Blue.' Instead of having to search the entire product database 104 for the non-driving criterion, the example searcher 114 of FIG. 2 enables the analyzer 206 to search twenty (20) records for the non-driving criterion 'Volume=100 mL' and forty (40) records for the non-driving criterion 'Color=Blue.'

The example analyzer 206 of FIG. 2 combines the results of the performed searches to form a set of search results 416 corresponding to the records of the product database 104 that meet the criteria of the first group 404 OR the criteria of the second group 406. In the illustrated example, the analyzer 206 of FIG. 2 performs additional searching on the generated search results 416 for the characteristic-value pair 'Brand=Pepsi®' and the characteristic-value pair 'Record-CreatedDate>=12 Nov. 2009.' The results of the additional searching represent the search results to be conveyed to the search requester (e.g., the example coder 106 of FIG. 1).

While an example manner of implementing the searcher 114 of FIG. 1 has been illustrated in FIG. 2, one or more of the elements, processes and/or devices illustrated in FIG. 2 may be combined, divided, re-arranged, omitted, eliminated and/or implemented in any other way. Further, the example statistics generator 200, the example interface 204, the example analyzer 206, the example grouper 208, the example statistics obtainer 210, the example driving criterion identifier 212, the example reduced set generator and/or, more generally, the example searcher 114 of FIG. 2 may be implemented by hardware, software, firmware and/or any combination of hardware, software and/or firmware. Thus, for example, any of the example statistics generator 200, the example interface 204, the example analyzer 206, the example grouper 208, the example statistics obtainer 210, the example driving criterion identifier 212, the example reduced set generator and/or, more generally, the example searcher 114 of FIG. 2 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the system or apparatus claims of this patent are read to cover a purely software and/or firmware implementation, at least one of the example statistics generator 200, the example interface 204, the example analyzer 206, the example grouper 208, the example statistics obtainer 210, the example driving criterion identifier 212, the example reduced set generator and/or, more generally, the example searcher 114 of FIG. 2 are hereby expressly defined to include a tangible computer readable storage medium such as a storage device (e.g., memory) or an optical storage disc (e.g., a DVD, a CD, a Bluray disc) storing the software and/or firmware. Further still, the example searcher 114 of FIG. 2 may include one or more elements, processes and/or devices in addition to, or instead of, those illustrated in FIG. 2, and/or may include more than one of any or all of the illustrated elements, processes and devices.

Figure 5:
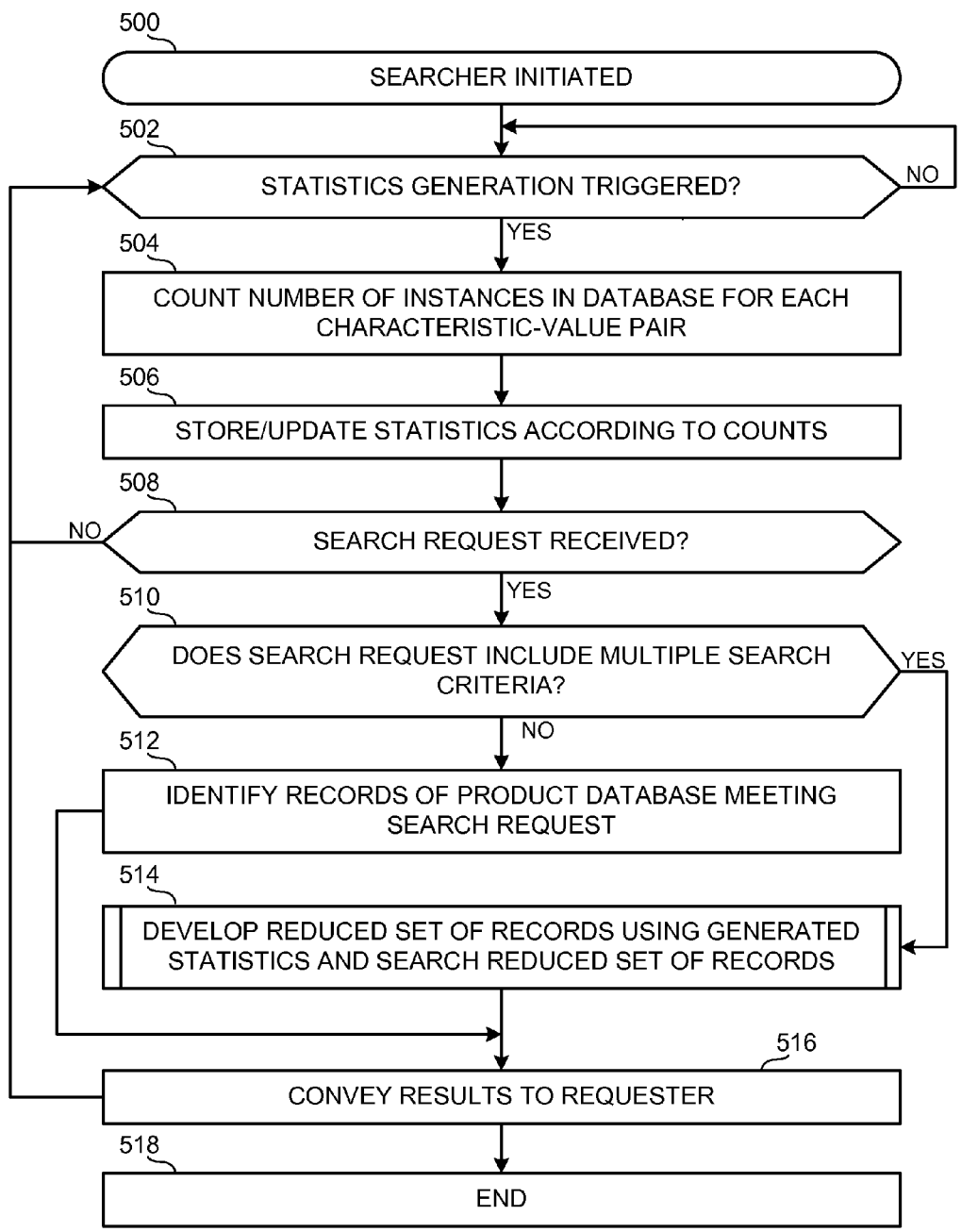
FIGS. 5 and 6 are flowcharts representative of example machine readable instructions that may be executed to implement the example searcher of FIGS. 1 and/or 2.
Figure 6:
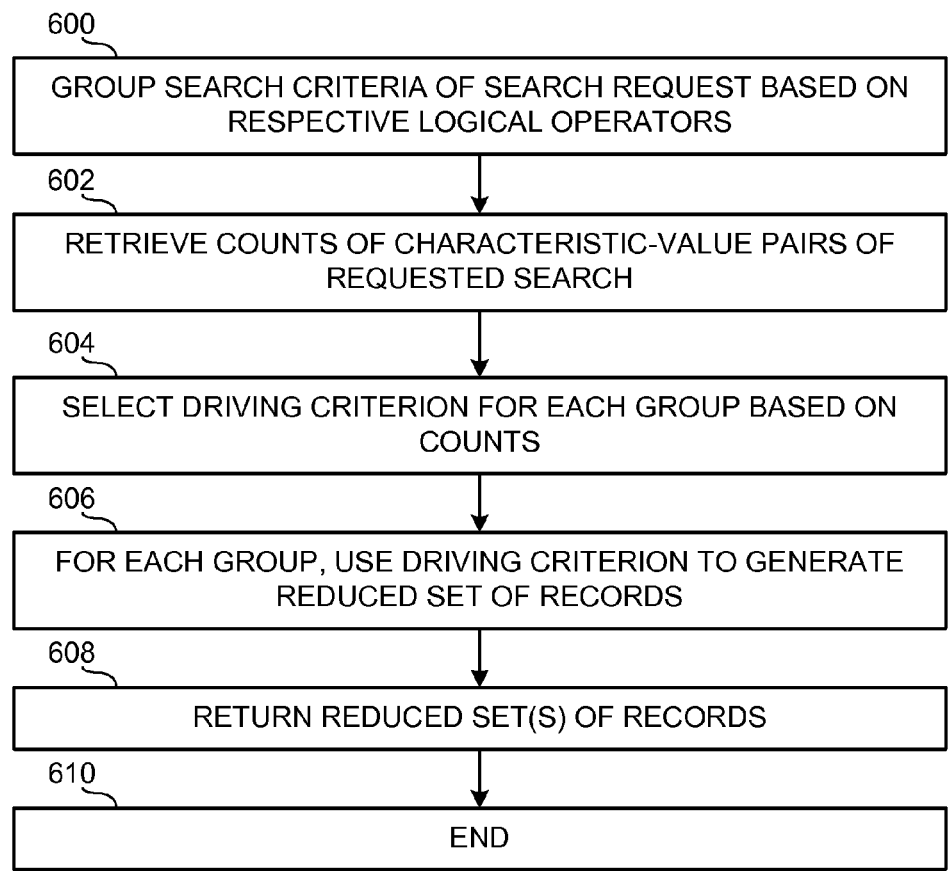

FIGS. 5 and 6 are flowcharts representative of example machine readable instructions for implementing the example searcher of FIGS. 1 and/or 2. In the example flowcharts of FIGS. 5 and 6, the machine readable instructions comprise program(s) for execution by a processor such as the processor 712 shown in the example processing platform 700 discussed below in connection with FIG. 7. The program(s) may be embodied in software stored on a tangible computer readable storage medium such as a CD-ROM, a floppy disk, a hard drive, a digital versatile disk (DVD), a Blu-ray disk, or a memory associated with the processor 712, but the entire program and/or parts thereof could alternatively be executed by a device other than the processor 712 and/or embodied in firmware or dedicated hardware. Further, although the example program(s) is described with reference to the flowcharts illustrated in FIGS. 5 and 6, many other methods of implementing the example searcher 114 may alternatively be used. For example, the order of execution of the blocks may be changed, and/or some of the blocks described may be changed, eliminated, or combined.

As mentioned above, the example processes of FIGS. 5 and 6 may be implemented using coded instructions (e.g., computer readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable storage medium is expressly defined to include any type of computer readable storage device and/or storage disc and to exclude propagating signals. Additionally or alternatively, the example processes of FIGS. 5 and 6 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

FIG. 5 begins with an initiation of the searcher 114 of FIGS. 1 and/or 2 (block 500). The initiation of the searcher 114 corresponds to, for example, the search provider 100 making the searcher 114 available to the coder 106 of FIG. 1 and/or the search requester 102 of FIG. 1. As described above, the example searcher 114 generates, maintains and utilized count statistics indicative of the content of the product database 104. In the example of FIG. 5, generations and/or updates of the count statistics are implemented by the example statistics generator 200 according to a schedule (e.g., once per week) and/or any other suitable triggering mechanism. When the example statistics generator 200 of FIG. 2 is triggered (block 502), the example statistics generator 200 counts the number of records that satisfy each characteristic-value pair present in the product database 104 at a time corresponding to the triggering of the statistics generator 200 (block 504). In the example of FIG. 5, the count statistics are stored in the example count statistics database 202 of FIG. 2 (block 506).

The example interface 204 of FIG. 2 determines whether a search request has been received (block 508). If not, control passes to block 502 and it is determined whether the statistics generator 200 has been triggered. If a search request has been received (block 508), the example interface 204 determines whether the received search request is a single-criterion request or a multiple-criteria request (block 510). If the search request only includes one search criterion, the example analyzer 206 of FIG. 2 searches the product database 104 to identify records satisfying the search request (block 512). Otherwise, if the received search request includes more than one search criteria (block 510), the example searcher 114 of FIG. 2 develops one or more reduced sets of records based on logical grouping(s) of the search criteria and the data of the count statistics database 202 and performs one or more searches using the developed reduced set(s) (block 514). The example of block 514 is described in detail below in connection with FIG. 6. The results of the operations performed by the example searcher 114 are conveyed to the search requester (block 516). The example of FIG. 5 then ends (block 518).

FIG. 6 begins with the example grouper 208 of FIG. 2 receiving the criteria of a multiple-criteria search request. The example grouper 208 identifies logical relationship(s) between the search criteria and groups the search criteria accordingly (block 600). In the illustrated example, grouping the search criteria includes identifying search criteria related via an AND operator and assigning the AND-related search criteria to the same group. The example statistics obtainer 210 also receives the search criteria of the search requests and uses the received data to obtain corresponding count statistics from the example count statistics database 202 (block 602). In some examples, the statistics generator 200 also generates statistics for any dynamic characteristic-value pairs of the received search request.

Using the obtained and/or generated counts, the example driving criterion identifier 212 selects one of the criteria of each group as the driving criterion for the respective group (block 604). In the illustrated example, the driving criterion identifier 212 selects the criterion satisfying the least amount of records of the product database 104 and, thus, having the lowest count in the statistics. The example reduced set generator 214 uses the selected driving search criterion for each group to generate a reduced set of records (block 606). In the illustrated example, the reduced set generator 214 queries the product database 104 with the selected driving search criterion to retrieve the records of the product database 104 satisfying the selected driving search criterion. The results generated by the reduced set generator 214 are stored as one or more reduced sets of records (block 608). As described above, the reduced set(s) of records are searched for the non-driving criterion to complete the requested search. The ability to search the reduced set(s) of records rather than the entire product database 104 for the non-driving criterion or criteria represents a significant improvement in search speed.

Figure 7:
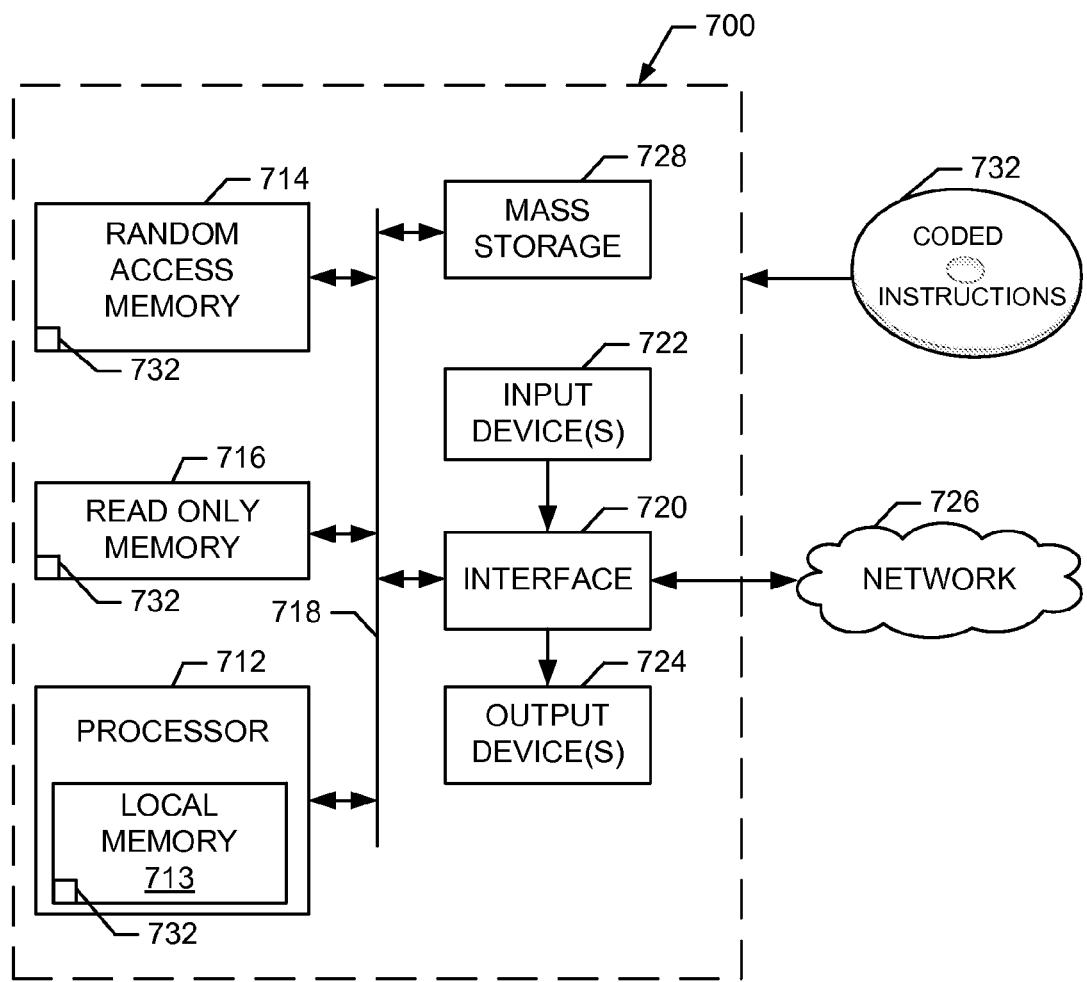
FIG. 7 is a block diagram of an example processing system capable of executing the example machine readable instructions of FIGS. 5 and/or 6 to implement the example searcher of FIGS. 1 and/or 2.

FIG. 7 is a block diagram of an example processor platform 700 capable of executing the instructions of FIGS. 5 and 6 to implement the example searcher 114 of FIGS. 1 and/or 2. The processor platform 700 can be, for example, a personal computer, an Internet appliance, a server, and/or any other type of computing device.

The processor platform 700 of the instant example includes a processor 712. For example, the processor 712 can be implemented by one or more microprocessors or controllers from any desired family or manufacturer.

The processor 712 includes a local memory 713 (e.g., a cache) and is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714 and the non-volatile memory 716 is controlled by a memory controller.

The example processor platform 700 of FIG. 7 also includes an interface circuit 720. The interface circuit 720 may be implemented by any type of interface standard, such as an Ethernet interface, a universal serial bus (USB), and/or a PCI express interface.

In the example of FIG. 7, one or more input devices 722 are connected to the interface circuit 720. The input device(s) 722 permit a user to enter data and commands into the processor 712. The input device(s) can be implemented by, for example, a keyboard, a mouse, a touchscreen, a track-pad, a trackball, isopoint and/or a voice recognition system.

In the example of FIG. 7, one or more output devices 724 are also connected to the interface circuit 720. The output devices 724 can be implemented, for example, by display devices (e.g., a liquid crystal display, a cathode ray tube display (CRT), a printer and/or speakers). The interface circuit 720, thus, typically includes a graphics driver card.

The interface circuit 720 also includes a communication device such as a modem or network interface card to facilitate exchange of data with external computers via a network 726 (e.g., an Ethernet connection, a digital subscriber line (DSL), a telephone line, coaxial cable, a cellular telephone system, etc.).

The processor platform 700 also includes one or more mass storage devices 728 for storing software and data. Examples of such mass storage devices 728 include floppy disk drives, hard drive disks, compact disk drives and digital versatile disk (DVD) drives. The mass storage device 728 may implement the frame database 318 of FIG. 3.

The coded instructions 732 of FIGS. 5 and/or 6 may be stored in the mass storage device 728, in the volatile memory 714, in the non-volatile memory 716, and/or on a removable storage medium such as a CD or DVD.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. An apparatus, comprising:
   a count generator to generate a plurality of counts, the counts respectively indicative of a number of corresponding records in a database satisfying a respective one of a plurality of criteria present in the database;
   a grouper to assign first and second criteria of a search request to a first group according to a logical relationship between the first and second criteria;
   an identifier to determine, via the plurality of counts, which of the first and second criteria in the first group is satisfied by a least amount of records in the database;
   a reduced set generator to identify a reduced set of records in the database to be searched, the reduced set of records corresponding to the first or second criteria that is satisfied by the least amount of records in the database; and
   an analyzer to search the reduced set of records from the database, the reduced set of records reducing a search time associated with the search request, wherein first ones of the plurality of counts corresponding to static ones of the plurality of criteria are generated according to a schedule, and second ones of the plurality of counts corresponding to dynamic ones of the plurality of criteria are generated in response to receiving a search request, at least one of the count generator, the grouper, the identifier, the reduced set generator or the analyzer including hardware.

2. The apparatus as defined in claim 1, further including an interface is to determine whether a second search request includes more than one criterion.

3. The apparatus as defined in claim 2, wherein the analyzer to search the database without generating the reduced set of records when the second search request includes only one criterion.

4. The apparatus as defined in claim 1, wherein the database includes a product database, and the plurality of criteria are characteristic-value pairs.

5. The apparatus as defined in claim 1, wherein the logical relationship between the first and second criteria is defined by an AND operator.

6. A method, comprising:
   generating, with a processor, a plurality of counts, the counts respectively indicative of a corresponding number of records in a database satisfying a respective one of a plurality of criteria present in the database;
   assigning, with the processor, first and second criteria of a search request to a first group according to a logical relationship between the first and second criteria;
   determining, with the processor, based on at least some of the plurality of counts, which of the first and second criteria in the first group is satisfied by a least amount of records in the database;
   forming, with the processor, a reduced set of records in the database to be searched, the reduced set of records corresponding to the first or second criteria that is satisfied by the least amount of records in the database; and
   searching the reduced set of records from the database, the reduced set of records reducing a search time associated with the search request, wherein first ones of the plurality of counts corresponding to static ones of the plurality of criteria are generated according to a schedule, and second ones of the plurality of counts corresponding to dynamic ones of the plurality of criteria are generated in response to receiving a search request.

7. The method as defined in claim 6, further including determining whether a second search request includes more than one criterion.

8. The method as defined in claim 7, further including searching the database without generating the reduced set of records when the second search request includes only one criterion.

9. The method as defined in claim 6, wherein the database includes a product database, and the plurality of criteria are characteristic-value pairs.

10. The method as defined in claim 6, wherein the logical relationship between the first and second criteria is defined by an AND operator.

11. A tangible machine readable storage medium comprising instructions that, when executed, cause a machine to at least:
    generate a plurality of counts, the counts respectively indicative of a corresponding number of records in a database satisfying a respective one of a plurality of criteria present in the database;
    assign first and second criteria of a search request to a first group according to a logical relationship between the first and second criteria;
    determine, based on at least some of the counts, which of the first and second criteria in the first group is satisfied by a least amount of records in the database;
    form a reduced set of records to be searched in the database corresponding to the determined one of the first and second criteria satisfying the least amount of records in the database; and
    search the reduced set of records in the database, the reduced set of records reducing a search time associated with the search request, wherein first ones of the plurality of counts corresponding to static ones of the plurality of criteria are generated according to a schedule, and second ones of the plurality of counts corresponding to dynamic ones of the plurality of criteria are generated in response to receiving a search request.

12. The storage medium as defined in claim 11, wherein the instructions, when executed, cause the machine to determine whether a second search request includes more than one criterion.

13. The storage medium as defined in claim 12, wherein the instructions, when executed, cause the machine to search the database without generating the reduced set of records when the second search request includes only one criterion.

14. The storage medium as defined in claim 11, wherein the database includes a product database, and the plurality of criteria are characteristic-value pairs.

15. The storage medium as defined in claim 11, wherein the logical relationship between the first and second criteria is defined by an AND operator.

* * * * *